(12) United States Patent
Maruyama et al.

(10) Patent No.: US 8,711,942 B2
(45) Date of Patent: Apr. 29, 2014

(54) MOVING PICTURE DECODING DEVICE AND MOVING PICTURE DECODING METHOD

(75) Inventors: Emi Maruyama, Kunitachi (JP); Yuji Kawashima, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 235 days.

(21) Appl. No.: 13/230,456

(22) Filed: Sep. 12, 2011

(65) Prior Publication Data
US 2012/0155537 A1 Jun. 21, 2012

(30) Foreign Application Priority Data
Dec. 17, 2010 (JP) ................................ 2010-282154

(51) Int. Cl.
*H04N 7/32* (2006.01)

(52) U.S. Cl.
USPC ................................. 375/240.16; 375/240.17

(58) Field of Classification Search
USPC ......................................... 375/240.16, 240.17
See application file for complete search history.

(56) References Cited

U.S. PATENT DOCUMENTS

| 8,630,347 B2 | 1/2014 | Fujisawa et al. | |
|---|---|---|---|
| 2007/0183499 A1 | 8/2007 | Kimata et al. | |
| 2007/0189735 A1* | 8/2007 | Kawashima et al. | 386/112 |
| 2007/0223585 A1 | 9/2007 | Fujisawa et al. | |
| 2009/0285564 A1 | 11/2009 | Kato et al. | |
| 2009/0290637 A1 | 11/2009 | Lai et al. | |
| 2009/0296811 A1* | 12/2009 | Jeon et al. | 375/240.12 |
| 2012/0147968 A1 | 6/2012 | Kawashima et al. | |

FOREIGN PATENT DOCUMENTS

| JP | 2004-289745 | 10/2004 |
|---|---|---|
| JP | 2006-101404 | 4/2006 |
| JP | 2007-180982 | 7/2007 |
| JP | 2007-208476 | 8/2007 |
| JP | 2007235456 | 9/2007 |
| JP | 2008-022475 | 1/2008 |
| JP | 2009-100071 | 5/2009 |
| JP | 2009-159466 | 7/2009 |
| JP | 2009544222 | 12/2009 |
| WO | WO 2006019093 | 2/2006 |
| WO | 2008-035665 A1 | 3/2008 |

OTHER PUBLICATIONS

Japanese Patent Application No. 2010-277389, Notification of Reasons for Refusal, mailed Mar. 21, 2012, (with English Translation).
Japanese Patent Application No. 2010-277389, Notification of Reasons for Refusal, mailed Aug. 21, 2012, (with English Translation).

(Continued)

*Primary Examiner* — Sath V Perungavoor
*Assistant Examiner* — Jeffery Williams
(74) *Attorney, Agent, or Firm* — Blakely, Sokoloff, Taylor & Zafman LLP (57) ABSTRACT

One embodiment provides a moving picture decoding device for decoding a compression-coded moving picture stream, including: an inter-view predicting module configured to perform inter-view prediction processing on processing subject blocks of each frame to be decoded; a load detector configured to detect a magnitude of an apparatus processing load including a processing load for decoding; a judging module configured to judge whether the magnitude of the apparatus processing load detected by the load detector is small; and a controller configured to control the inter-view predicting module so as to cause simplification of the inter-view prediction processing if the judging module judges that the magnitude of the apparatus processing load is not small.

9 Claims, 11 Drawing Sheets

(56) References Cited

OTHER PUBLICATIONS

Japanese Patent Application No. 2010-277389, Notification of Reasons for Refusal, mailed Jan. 29, 2013, (with English Translation).

U.S. Appl. No. 13/230,477, Non Final Office Action, mailed Sep. 9, 2013.

Japanese Patent Application No. 2010-282154, Notice of Reasons for Refusal, mailed Mar. 21, 2012, (with English Translation).

* cited by examiner

☐ : INTEGER PIXEL  ■ : PIXEL GENERATED BY INTERPOLATION USING MOTION VECTOR AS EXEMPLIFIED

⟶ : MOTION VECTOR (INTEGER-PRECISION PORTION)

⇢ : MOTION VECTOR (1/4-PRECISION PORTION)

▨ : PIXELS GENERATED BY INTERPOLATION USING MOTION VECTORS OF PRECISION THAT IS HIGHER THAN INTEGER pixel PRECISION, LIKE ILLUSTRATED PIXEL

FIG. 4

☐ : INTEGER PIXEL    ■ : PIXEL GENERATED BY INTERPOLATION USING INTER-VIEW VECTOR AS EXEMPLIFIED

⟶ : INTER-VIEW VECTOR    ⟶ : INTER-VIEW VECTOR (INTEGER-PRECISION PORTION)

┄⟶ : INTER-VIEW VECTOR (1/4-PRECISION PORTION)

▨ : PIXELS GENERATED BY INTERPOLATION USING INTER-VIEW VECTORS OF PRECISION THAT IS HIGHER THAN INTEGER pixel PRECISION, LIKE ILLUSTRATED PIXEL

MOVING PICTURE DECODING DEVICE AND MOVING PICTURE DECODING METHOD

CROSS-REFERENCE TO RELATED APPLICATION(S)

This application claims priority from Japanese Patent Application No. 2010-282154 filed on Dec. 17, 2010, the entire contents of which are incorporated herein by reference.

FIELD

Embodiments described herein relate generally to a moving picture decoding device and a moving picture decoding method for decoding a multiview moving picture.

BACKGROUND

H.264/MVC which is an extended version of the H.264/AVC standard and relates to a multiview moving picture coding scheme is employed in Blu-ray 3D. Whereas realizing a large compression ratio by performing inter-view prediction in addition to H.264/AVC inter prediction in motion compensation, in H.264/MVC, the amount of processing is large and increases in proportion to the number of view points, particularly when reproducing a high-resolution multiview picture as in the case of Blu-ray 3D.

On the other hand, theoretically, inter-view prediction provides a high correlation because pictures of the same time point and different view points are referred to. Pictures of adjoining view points would be similar to each other in a large number of portions of a region concerned. Although it is desired to provide more efficient processing which employs inter-view prediction having such features in addition to a conventional deblocking technique, no means for realizing that desire is known.

BRIEF DESCRIPTION OF DRAWINGS

A general architecture that implements the various features of the present invention will now be described with reference to the drawings. The drawings and the associated descriptions are provided to illustrate embodiments and not to limit the scope of the present invention.

DETAILED DESCRIPTION

In general, one embodiment provides a moving picture decoding device for decoding a compression-coded moving picture stream, including: an inter-view predicting module configured to perform inter-view prediction processing on processing subject blocks of each frame to be decoded; a load detector configured to detect a magnitude of an apparatus processing load including a processing load for decoding; a judging module configured to judge whether the magnitude of the apparatus processing load detected by the load detector is small; and a controller configured to control the inter-view predicting module so as to cause simplification of the inter-view prediction processing if the judging module judges that the magnitude of the apparatus processing load is not small.

An embodiment will be described with reference to FIGS. 1-11. The same elements will be given the same reference symbol and will not be described redundantly.

Figure 11:
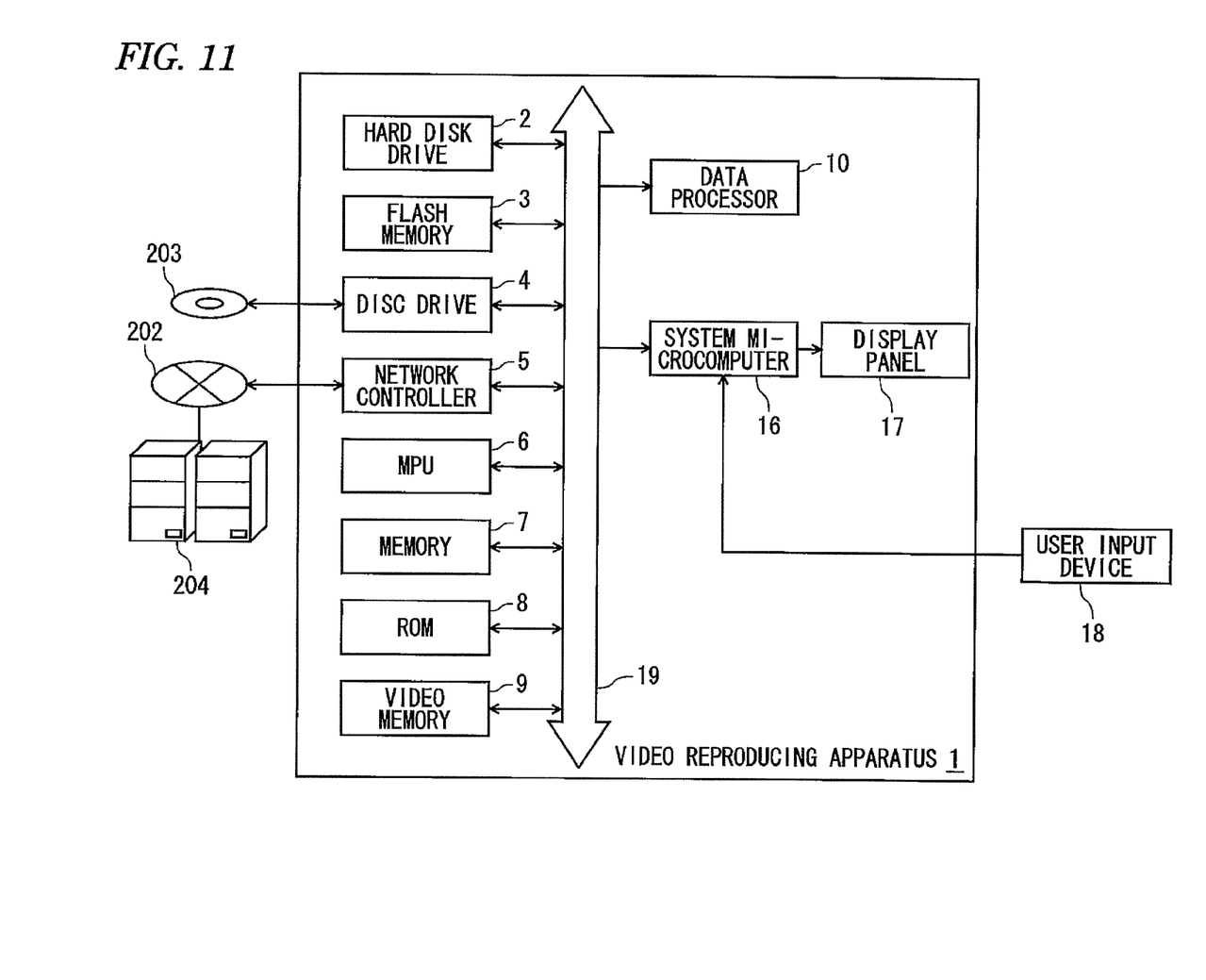
FIG. 11 illustrates a system configuration of a video reproducing apparatus 1 using the moving picture decoding device 100 according to the embodiment, together with a recording medium 203 and a network storage 204.

A moving picture decoding device 100 according to the embodiment is provided in a video reproducing apparatus 1 shown in FIG. 11. FIG. 11 illustrates a system configuration of the video reproducing apparatus 1 together with a recording medium 203 and a network storage 204. As shown in FIG. 11, the video reproducing apparatus 1 is configured to read digital video content data (data for reproduction of a video content such as a movie or a drama) from the recording medium 203 such as an optical disc and to reproduce its video content and interactive data (data to be reproduced in connection with the video content and including menu data, animation data, effect sound data, content commentary data (e.g., data of a commentary on the video content), quiz data, and other data). And the video reproducing apparatus 1 is configured to be connected to the network storage 204 via the Internet 202 and to obtain video content data also from the network storage 204 and to reproduce its video content and interactive data.

The video reproducing apparatus 1 includes a hard disk drive 2, a flash memory 3, a disc drive 4, and a network controller all of which are connected to a bus 19. The hard disk drive 2 writes and reads digital data such as video content data to and from a magnetic disk that is rotating at high speed.

Digital data such as video content data is written to and read from the flash memory 3. The disc drive 4 has a function of reading digital data such as video content data from the recording medium 203 and outputting a reproduction signal. The network controller 5 controls writing or reading of digital data such as video content data to or from the network storage 204 over the Internet 202.

The video reproducing apparatus 1 also includes an MPU (micro processing unit) 6, a memory 7, a ROM 8, and a video memory 9 all of which are connected to the bus 19. Activated by an activation program read from the ROM 8 into the memory 7, the MPU 6 reads a player program from the ROM 8 into the memory 7, controls system initialization, system ending, etc. and processing of a system microcomputer 16 according to the player program. Furthermore, the MPU 6 instructs a data processor 10 (described later) to reproduce video and audio based on video content data that is read from one of the recording medium 203, the network storage 204, the hard disk drive 2, and the flash memory 3. The memory 7 stores data and a program to be used when the MPU 6 operates. The ROM 8 is stored with programs to be run by the MPU 6 such as the activation program and the player program, programs (e.g., a video reproduction program for reproducing video and audio by decoding a compression-coded moving picture/audio data such as video content data) to be run by the data processor 10, permanent data, etc. Decoded picture data D (described later) are written to the video memory 9 sequentially.

Operating according to the video reproduction program, the data processor 10 separates compression-coded moving picture/audio data into moving picture data and audio data, decoding them, and reproduces video and audio. The system microcomputer 16 causes a display panel 17 to display reproduction information of a video content, and inputs, to the MPU 6, via the bus 19, a manipulation input signal that is input from a user input device 18 (a remote controller or a device such as manipulation buttons that is provided in the video reproducing apparatus 1 and enables manipulation input). The display panel 17 displays, on its liquid crystal display panel, various kinds of information relating to reproduction of a video content and interactive data according to instructions from the system microcomputer 16.

Figure 2:
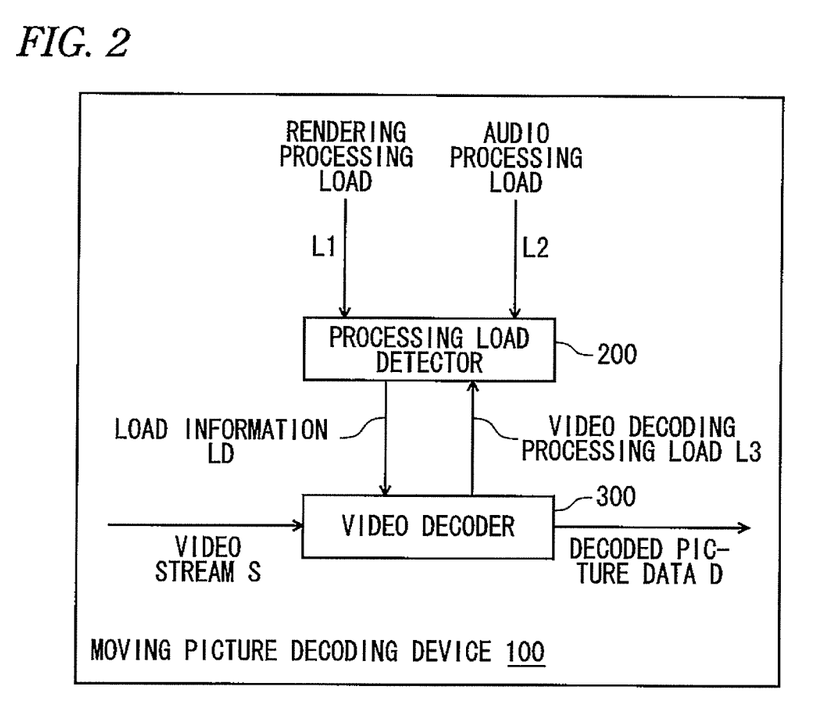
FIG. 2 illustrates a block configuration of a moving picture decoding device 100 according to the embodiment which includes the video decoder 300 and a processing load detector 200.

FIG. 2 illustrates a block configuration of the moving picture decoding device 100 which is provided in the video reproducing apparatus 1 shown in FIG. 2. The moving picture decoding device 100 is a software decoder which is realized by a moving picture decoding processing program which is one module of the video reproduction program. The moving picture decoding processing program is software for decoding moving picture data S (e.g., video content data; hereinafter referred to as "moving picture stream") which is compression-coded according to a coding method defined by the H.264/MVC standard. The moving picture decoding processing program is run by the data processor 10, and has functions corresponding to a processing load detector (a processing load detecting module of the moving picture decoding processing program) 200 and a video decoder (a decoding execution module of the moving picture decoding processing program) 300 shown in FIG. 2.

The processing load detector 200 has a function of a load detecting means which detects magnitudes of various processing loads (hereinafter referred to as "apparatus processing loads") that occur in the video reproducing apparatus 1 including a decoding processing load of the video decoder 300. In the embodiment, the apparatus processing loads to be detected are a rendering processing load L1 of rendering for visualizing reproduced video data and generating a picture to be displayed, an audio processing load L2 of audio output, and a video decoding processing load L3 of decoding that is performed by the video decoder 300. For example, a magnitude of each processing load (load amount) is determined based on a use rate of the MPU 6 (or the data processor 10). Alternatively, it may be determined based on a combination of a use rate of the MPU 6 and use rates of the memory 7 and the video memory 9.

To allow smooth operation of a software decoder, usually a memory (e.g., memory 7) having a size that is larger than a predetermined size is necessary. The performance of the software decoder lowers as the use rate of the memory increases. Therefore, detecting a magnitude of a total apparatus processing load based on a combination a use rate of the MPU 6 (or the data processor 10) and use rates of the memory 7 and the video memory 9 makes it possible to accurately judge whether or not the load amount adversely affects smooth operation of the software decoder.

The processing load detector 200 generates load information LD which indicates a detected magnitude of a total apparatus processing load and inputs it to the video decoder 300. The load information LD is used by the video reproducing apparatus 1 to judge whether or not the load amount adversely affects the execution of the decoding processing of the video decoder 300 (this state is called "heavy load state" described later).

The video decoder 300 receives a moving picture stream S and outputs decoded picture data D by decoding (expanding) it and performing other processing (described later in detail). Although not shown in FIG. 2, the decoded picture data D is subjected to combining processing. A video output signal corresponding to resulting combined picture data is output from the video reproducing apparatus 1.

MPEG4-AVC/H.264 (hereinafter abbreviated as H.264) supports the multiview video codec (hereinafter abbreviated as MVC). Typical examples of multiview video which is a coding subject of MVC are 3D video and multiview 3D video. Three-dimensional video consists of two (left-eye and right-eye) two-dimensional videos taken from different angles (or two two-dimensional videos obtained by processing in which a left-eye/right-eye view is taken into consideration). One can recognize the two two-dimensional videos as 3D video when he or she sees the left-eye video and the right-eye video through his or her left eye and right eye, respectively, during reproduction.

The multiview moving picture coding scheme H.264/MVC increases the coding efficiency by using inter-view prediction in which pictures of different views are referred to in addition to inter prediction of the same view. Inter-view prediction should provide a high correlation because pictures of the same time point and different view points are referred to. Pictures of adjoining view points would be similar to each other in a large number of portions of a region concerned. Therefore, both of picture quality degradation and the decoding processing amount can be reduced by performing, under the following conditions, partially omitted decoding processing on blocks that are decoded by using inter-view prediction.

MVC has features that inter-view prediction is introduced in addition to inter prediction and that the signal processor is not changed though the header information of a stream is increased slightly. Therefore, an inter-view vector indicating a pixel block displacement in inter-view prediction and a motion vector in inter prediction are subjected to the same signal processing. The inter-view vectors do not appear in the H.264 specification, because the both vectors are same from view point of a pixel block displacement. In order to better understand the description, the inter-view vectors are used hereinafter.

On the other hand, MVC has a problem that the amount of processing is large and increases in proportion to the number of view points. This problem is serious particularly in reproducing a high-resolution multiview picture as in the case of Blu-ray 3D. Inter-view prediction should provide a high correlation because pictures of the same time point and different view points are referred to. Pictures of adjoining view points would be similar to each other in a large number of portions of a region concerned. In the embodiment, attention is paid to this similarity between pictures of adjoining view points. In picture decoding processing in which inter-view prediction is performed, the vertical component of an inter-view vector is subjected to rounding or round-down/round-up to integer pixel precision whereas a ¼ pixel precision motion vector contained in coded data is used for the horizontal component, whereby the amount of interpolation processing including FIR filter processing can be reduced.

Next, the video decoder 300 will be described with reference to FIG. 1.

Figure 1:
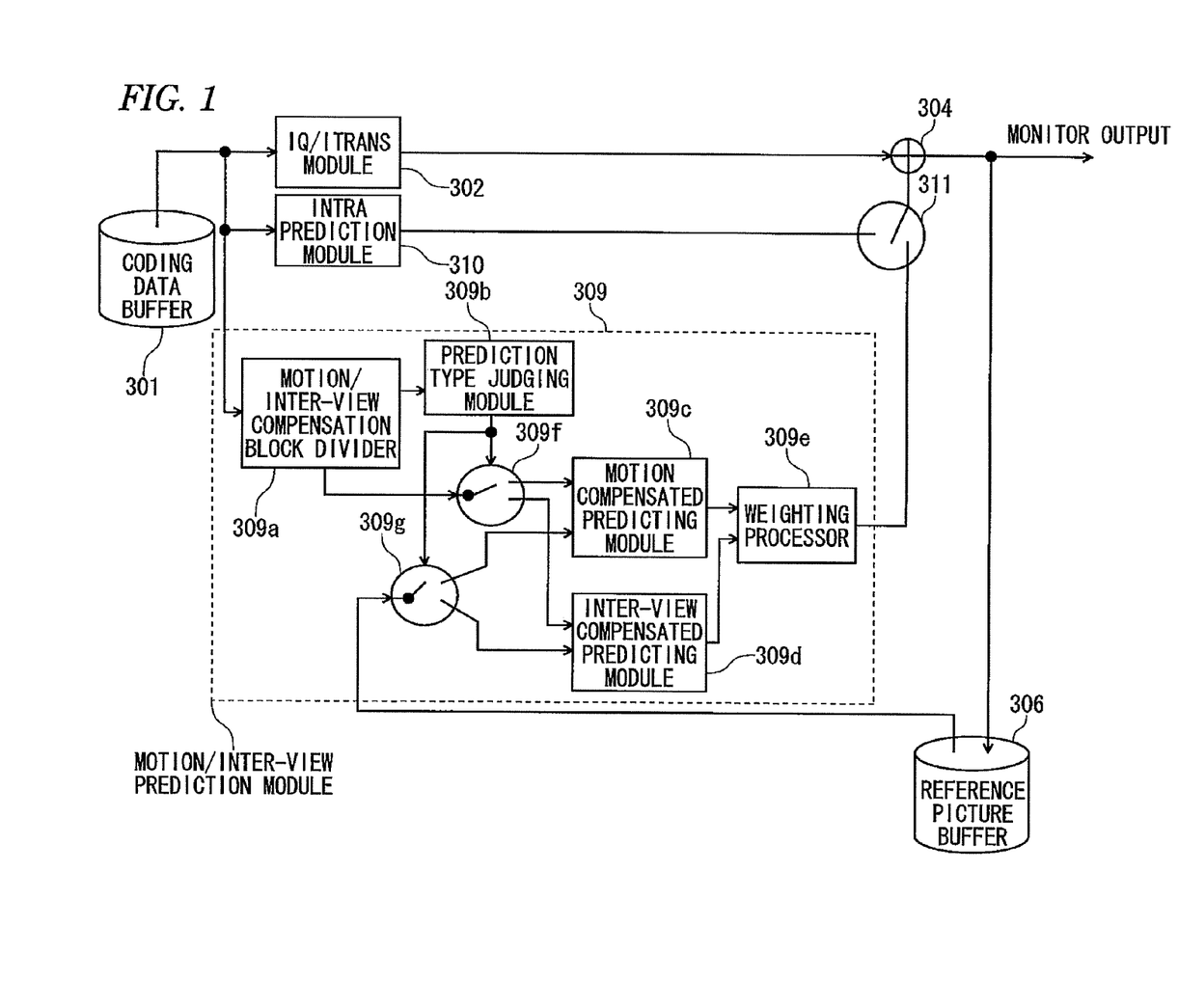
FIG. 1 illustrates a block configuration of a video decoder 300 used in an embodiment which includes a motion/inter-view prediction module 309.

As shown in FIG. 1, the video decoder 300, which complies with the H.264/MVC standard, includes a coding data buffer 301, inverse-quadrature-transformer (for performing inverse DCT (discrete cosine-transform))/dequantizer (hereinafter abbreviated as IQ/ITRANS module) 302, an adder 304, a reference picture buffer (frame memory) 306, a motion/inter-view prediction module 309, an intra prediction module 310, and a mode changeover switch 311. Although the H.264 quadrature transformation is of integer pixel precision and hence is different from conventional DCT, in the embodiment it is regarded as DCT.

The motion/inter-view prediction module 309 includes a motion/inter-view compensation block divider 309a, a prediction type judging module 309b, a motion compensated predicting module 309c, an inter-view compensated predicting module 309d, and a weighting processor 309e.

A deblocking filter 305 may be provided after the adder 304. A monitor output (to the display panel 17 or the like) may be output from the reference picture buffer (frame memory) 306.

The video decoder 300 divides each frame (picture) of a moving picture stream S into macroblocks, for example, and performs decoding on a macroblock-by-macroblock basis. Each macroblock consists of 16 blocks, for example, and each block includes 16 (4×4) pixels.

Each macroblock is decoded while one of an intra-frame coding mode (intra coding mode) and a motion/inter-view compensated prediction coding mode (inter coding mode) is selected for it.

In the intra coding mode, an intra prediction signal has been generated from a coded signal of a coding subject frame in units of a predetermined shape. A prediction residual obtained by subtracting the intra prediction signal from the coding subject frame has been coded by quadrature transformation (DCT), quantization, and entropy coding. In the motion/inter-view compensated prediction coding mode, a motion compensated prediction signal has been generated in units of a predetermined shape. The motion compensated prediction signal has been generated to detect, as a variation component, only portions that are different from an already coded frame and estimates motion using those portions. A prediction residual obtained by subtracting the motion compensated inter prediction signal from a coding subject frame has been coded by quadrature transformation (DCT), quantization, and entropy coding. Furthermore, in the motion/inter-view compensated prediction coding mode, an inter-view compensated prediction signal has been generated in units of a predetermined shape. The inter-view compensated prediction signal has been generated to detect, as a variation component, only portions that are different from a coded frame and estimates a view variation using those portions. A prediction residual obtained by subtracting the inter-view compensated prediction signal from the coding subject frame has been coded by quadrature transformation (DCT), quantization, and entropy coding.

The codec corresponding to the H.264/AVC standard which is the predecessor of the H.264/MVC standard employs the following techniques (1)-(6) and other techniques to attain a larger compression ratio than MPEG2.

Figure 10:
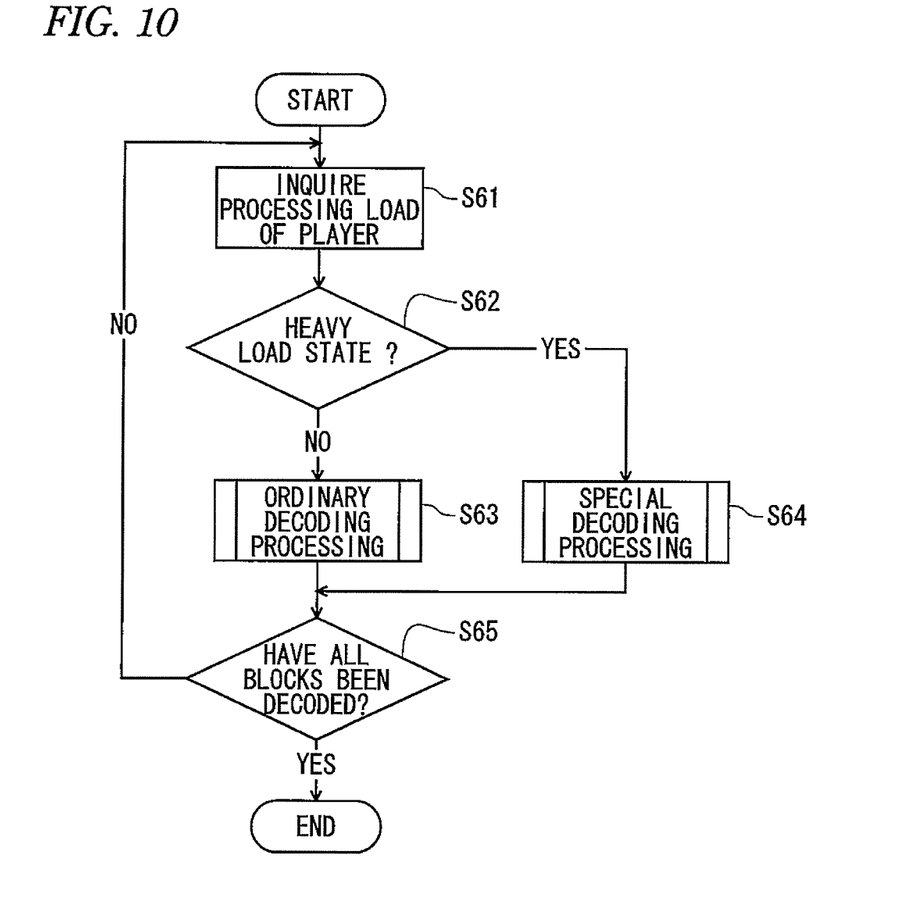
FIG. 10 illustrates a decoding process which is executed by the video reproducing apparatus 1.

(1) Motion compensation of higher pixel precision (¼ pixel precision) than in the conventional MPEG standard (2) Intra prediction for performing intra-frame coding efficiently (3) A deblocking filter for reducing block distortion (4) Integer DCT performed in units of 4×4 pixels (5) Multi-reference frames which enable use of plural frames located at arbitrary positions as reference frames (6) Weighted prediction As shown in FIG. 10, if a load level that is obtained from a load amount detected at a certain time point is higher than or equal to a prescribed value L and the block concerned is an inter-view prediction block, decoding processing of inter-view compensated prediction is partially bypassed (special decoding processing). If not, decoding processing specified by H.264 (ordinary decoding processing) is performed.

A load amount may be detected (i.e., a judgment for switching between ordinary decoding and special decoding may be made) in units of any of a block, a macroblock, a slice, a picture, a GOVU (I picture interval), and a sequence (IDR picture interval).

The operation procedure of a decoding process which is executed by the video reproducing apparatus 1 (player) will be described with reference to FIG. 10. When the decoding process is executed according to FIG. 10, the data processor 10 runs the moving picture decoding processing program and operates as a controller of the embodiment.

Upon a start of the decoding process of the moving picture decoding processing program, at step S61 the data processor 10 inquires a current load of the video reproducing apparatus 1. The processing load detector 200 detects a magnitude of the apparatus processing load based on, for example, a use rate of the data processor 10, and load information LD is input to the video decoder 300.

At step S62, the data processor 10 judges whether or not the current load is in a heavy load state based on the load information LD received at step S61, that is, based on whether or not the current load of the video reproducing apparatus 1 is heavier or equal to a prescribed reference value L.

If it is judged that the current load is not in a heavy load state, the process moves to step S63. In this case, the data processor 10 performs ordinary decoding processing, that is, the above-described pieces of decoding processing using all of the inter-view compensated predicting module 309d. Therefore, a moving picture stream S is decoded by ordinary decoding processing unless the video reproducing apparatus 1 is rendered in a heavy load state, that is, the decoding performance is lowered.

On the other hand, if it is judged that the current load is in a heavy load state, the process moves to step S64. In this case, the data processor 10 performs special decoding processing, that is, the above-described pieces of decoding processing without using part of the inter-view compensated predicting module 309d.

Upon execution of step S63 or S64, the process moves to step S65, where it is judged whether all of the moving picture stream S has been decoded. If not all of the moving picture stream S has been decoded, the process returns to step S61. If all of the moving picture stream S has been decoded, the process is finished.

A description will now be made of an example operation with attention paid to the motion/inter-view prediction module 309. Coded data is subjected to signal processing on a macroblock-by-macroblock basis. The macroblock is a unit of coding processing which has a size of 16 (vertical)×16 (horizontal) pixels, and decoding signal processing is also performed on a macroblock-by-macroblock basis. Residual components are subjected to dequantization and inverse transformation in the IQ/ITRANS module 302. Of a prediction picture, an intra-predicted macroblock is processed by the intra prediction module 310 and resulting data is added to an output of the IQ/ITRANS module 302. Of the prediction picture, a macroblock used in motion prediction and/or interview prediction is input to the motion/inter-view prediction module 309 and resulting data is added to an output of the IQ/ITRANS module 302. Reference pictures to be used in motion prediction/inter-view prediction are stored in the reference picture buffer 306.

Next, the motion/inter-view prediction module 309 will be described. The motion/inter-view compensation block divider 309a divides each macroblock into motion/inter-view compensation blocks. And a residual vector, a reference number for identification of a reference picture, and prediction direction information (both directions, forward direction, or backward direction) are obtained for each motion/inter-view compensation block. Based on the reference number and the prediction direction information, the prediction type judging module 309b judges whether each motion/inter-view compensation block is a motion compensation block or a inter-view compensation block. Prediction directions that are output from the motion/inter-view compensation block divider 309a, reference pictures identified by reference numbers and supplied from the reference picture buffer 306, and decoded macroblock vectors are allocated to the motion compensated predicting module 309c and the inter-view compensated predicting module 309d. The residual vectors that are output from the motion/inter-view compensation block divider 309a are also allocated to the motion compensated predicting module 309c and the inter-view compensated predicting module 309d. The motion compensated predicting module 309c calculates a prediction vector of a motion compensation block from a decoded vector that is supplied from the reference picture buffer 306, and calculates an actual vector by adding the prediction vector to a residual vector. Likewise, the inter-view compensated predicting module 309d calculates a prediction vector of an inter-view compensation block from a decoded vector that is supplied from the reference picture buffer 306, and calculates an actual vector by adding the prediction vector to a residual vector. As described later, the motion compensated predicting module 309c and the inter-view compensated predicting module 309d are different from each other in calculated vectors and processing methods of prediction interpolation using a reference picture. Pixel blocks obtained by the motion compensated predicting module 309c and the inter-view compensated predicting module 309d are subjected to weighting processing in the weighting processor 309e, prediction pixel blocks are obtained, and one macroblock is constructed. The macroblock is added to the residual components and an addition result is output as a monitor output.

Figure 3:
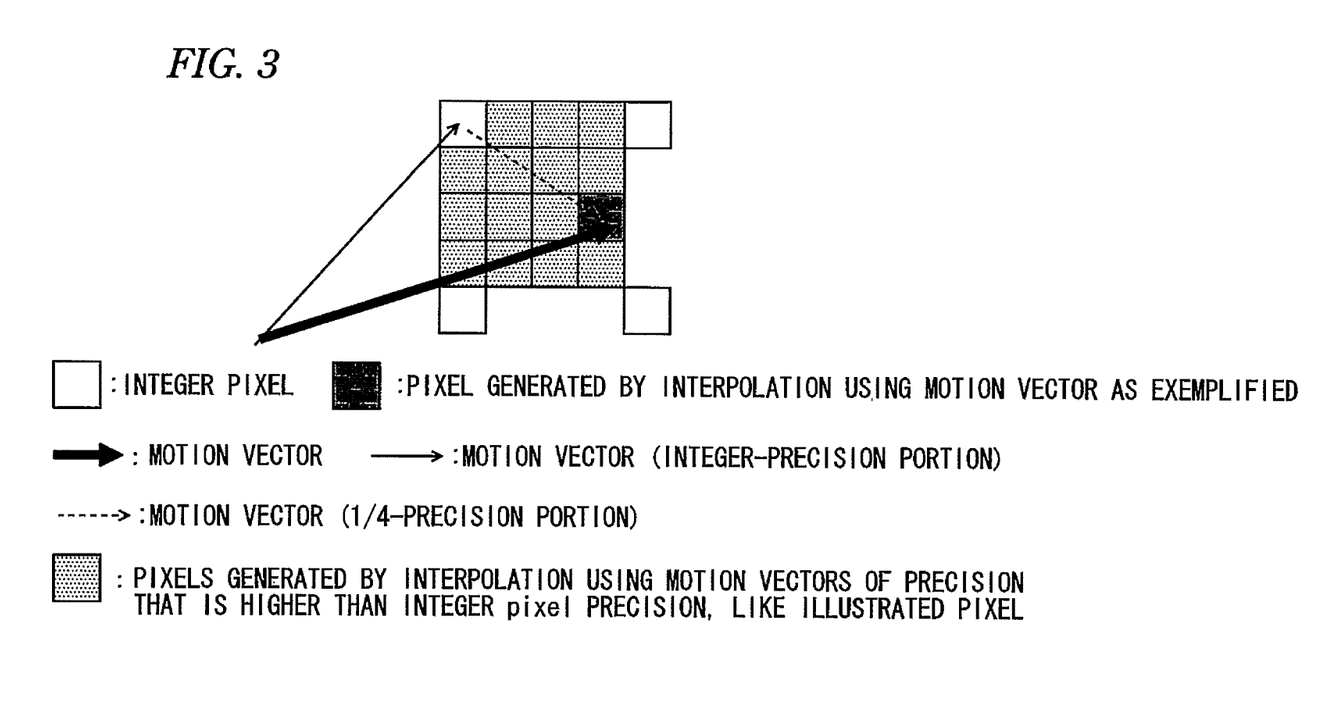
FIG. 3 illustrates a pixel that is interpolated by motion prediction in the embodiment.
Figure 4:
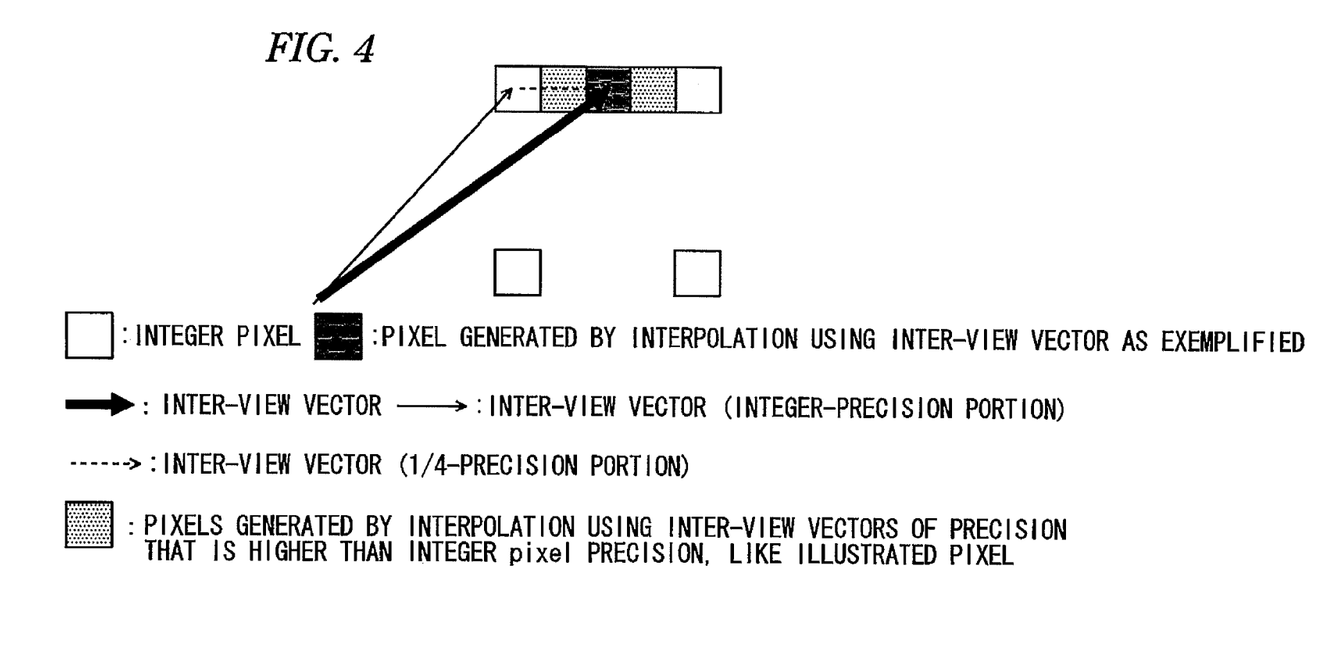
FIG. 4 illustrates a pixel that is interpolated by inter-view prediction in the embodiment.

FIG. 3 shows a pixel that is interpolated by motion prediction. A motion vector, which is of ¼ pixel precision, is divided into an integer-precision portion and a ¼-precision portion. Pixel interpolation is performed in the case where the motion vector points the ¼ pixel indicated by the hatched lines with respect to the reference integer pixel. FIG. 4 shows a pixel that is interpolated by inter-view prediction of the embodiment. Like a motion vector, an inter-view vector is of ¼ pixel precision. As long as the H.264 standard is followed, the same pixel as the interpolation pixel of the motion prediction shown in FIG. 3 is interpolated. In this application, as shown in FIG. 4, a pixel to be interpolated by inter-view prediction is given integer pixel precision in the vertical direction whereas it is given ¼ pixel precision in the horizontal direction. In this manner, the number of pixels generated by interpolation can be reduced. The means for changing the precision of the vertical component of an inter-view vector to integer pixel precision is rounding-off/rounding-up processing or rounding processing. The interpolation processing time or the processing circuit scale can be reduced by giving integer pixel precision to the vertical component of an inter-view vector.

The interpolation processing by the H.264 motion prediction and that by the inter-view prediction according to the embodiment will be compared with each other below.

Figure 5:
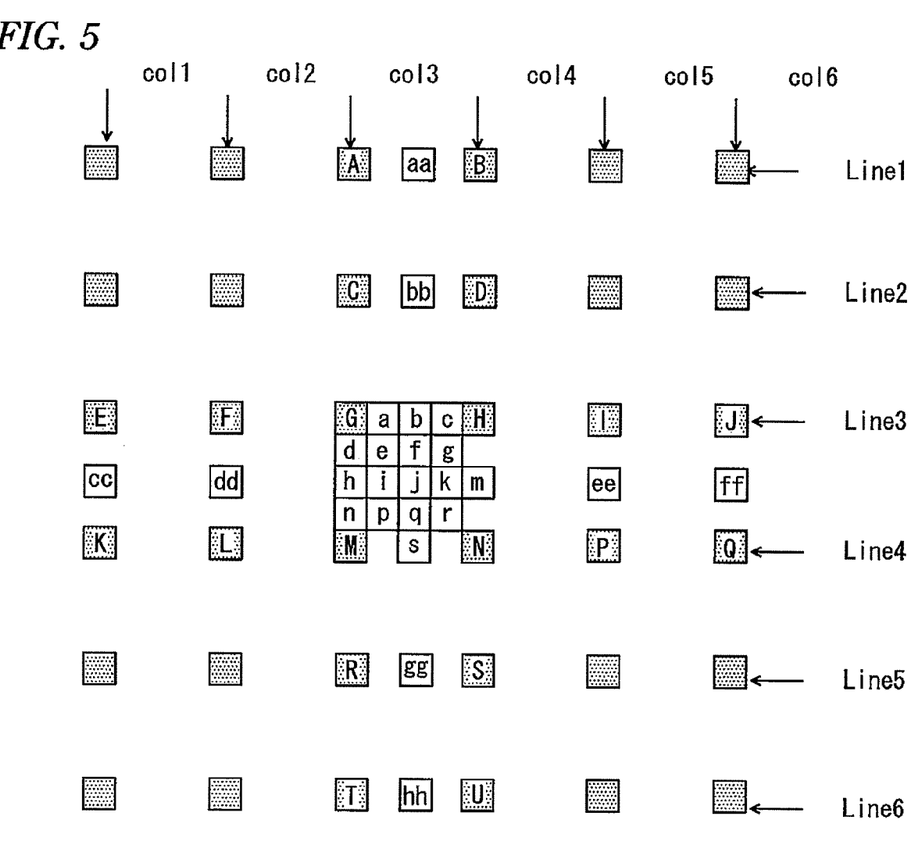
FIG. 5 illustrates pixel lines and pixel columns that are used for description of the device according to the embodiment.

FIG. 5 shows pixel lines (line1-line6) and pixel columns (col1-col6) that will be used for description of the device according to the embodiment. Shaded squares in FIG. 5 are integer pixels among which a pixel G is a reference integer pixel (see FIGS. 3 and 4). White squares are pixels that have been generated by interpolation. To generate a pixel (e.g., f) at a ¼ pixel precision pixel position, first, pixels at ½ pixel precision pixel positions are obtained by a 6-tap FIR filter (e.g., aa, bb, b, s, gg, and hh are obtained from integer-pixel lines line1, line2, line3, line4, line5, and line6, respectively). A pixel (e.g., j) at ½ pixel precision pixel position that is located at the middle position between four integer pixels (e.g., G, H, M, and N) is generated from the thus-obtained pixels (e.g., aa, bb, b, s, gg, and hh) at the ½ pixel precision pixel positions by a 6-tap FIR filter. A pixel (e.g., f) at a ¼ pixel precision pixel position, that is, at the middle between two pixels (e.g., j and b) located at ½ pixel precision pixel positions, is generated by averaging values of these two pixels by an averaging filter.

Figure 6:
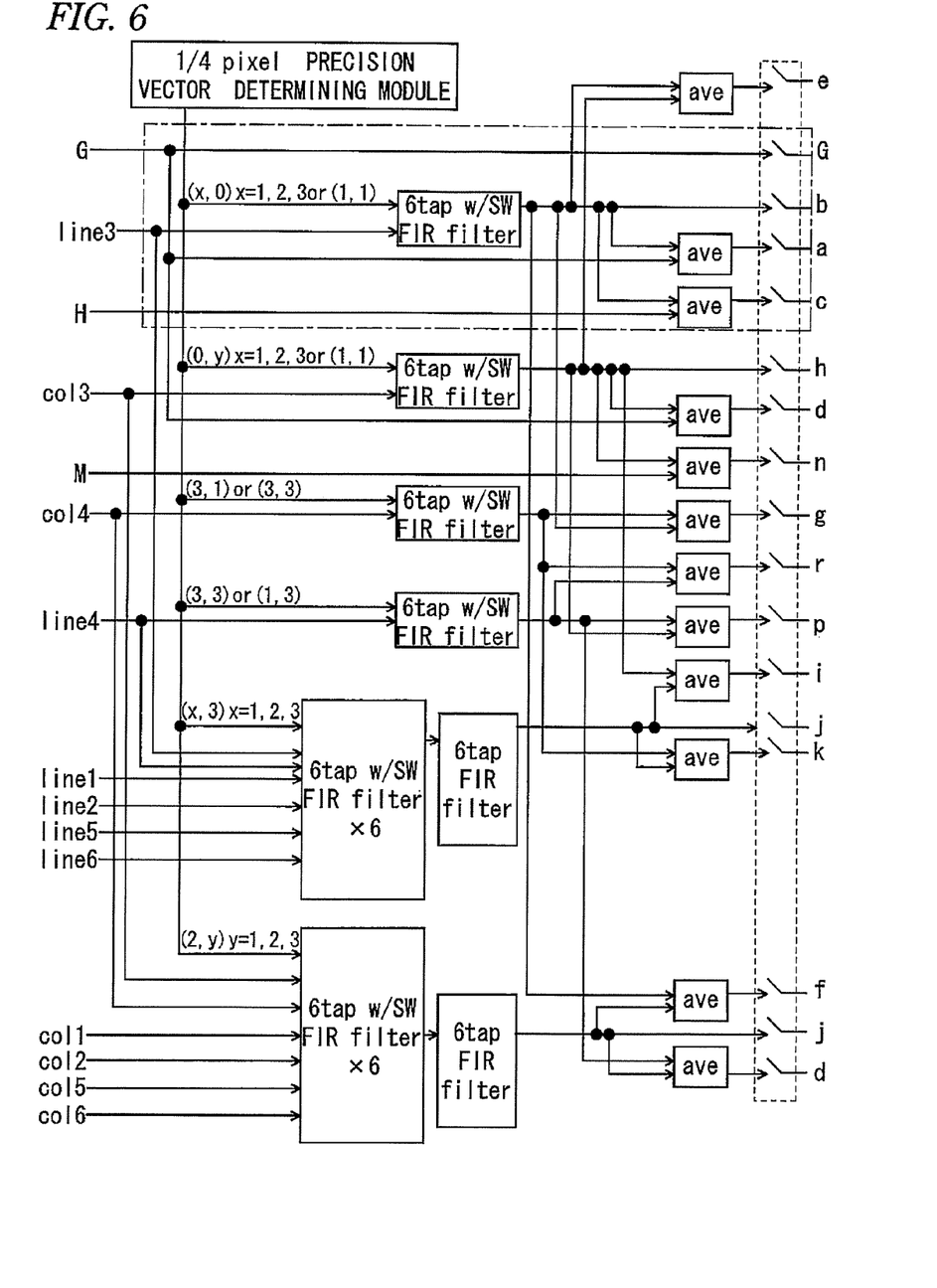
FIG. 6 illustrates a block configuration of a pixel interpolation generator of a motion compensated predicting module 309c used in the embodiment.

FIG. 6 shows a pixel interpolation generator of the motion compensated predicting module 309c. Input integer pixels are G, H, and M, six pixels of each of the pixel lines line1-line6, and six pixels of each of pixel columns (col3 includes G and M, col4 includes H, line3 includes G and H, and line4 includes M). Output pixel signals are G, and interpolation-generated ones a, b, c, d, e, f, g, h, i, j, k, n, p, q, and r. A ¼ pixel precision vector determining module determines a ¼-precision portion of a vector, determines a position of a pixel to be generated based on a horizontal component (x) and a vertical component (y), performs processing switching. A processing switching signal is input to two 6-tap w/SW (with switch) FIR filter×6 circuits, four 6-tap w/SW FIR filters, and an output final stage to turn on only circuits that relate to the pixel to be generated.

Figure 7:
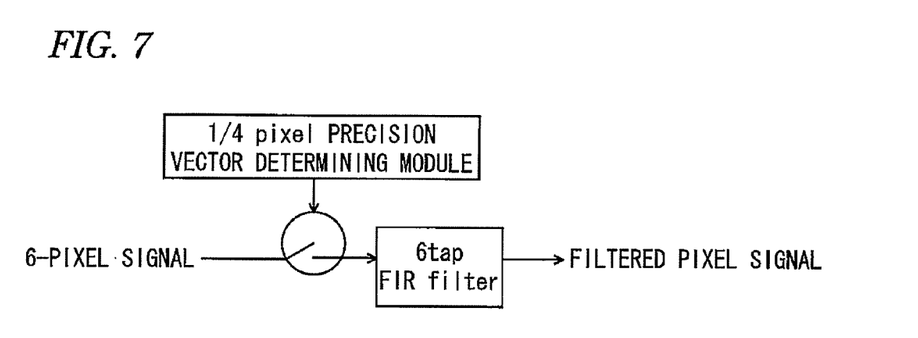
FIG. 7 illustrates a block configuration of each 6-tap w/SW FIR filter used in the embodiment.

FIG. 7 shows details of each 6-tap w/SW FIR filter. In response to an on-signal supplied from the ¼ pixel precision vector determining module, a 6-tap FIR filter receives a 6-pixel signal and outputs a filtered pixel signal. Filter coefficients are (1, −5, 20, 20, −5, 1)/32. The turn-on condition depends on the coordinates of a pixel to be generated by interpolation. In FIG. 6, each arrow originating from the ¼ pixel precision vector determining module is accompanied by sets of coordinates.

Figure 8:
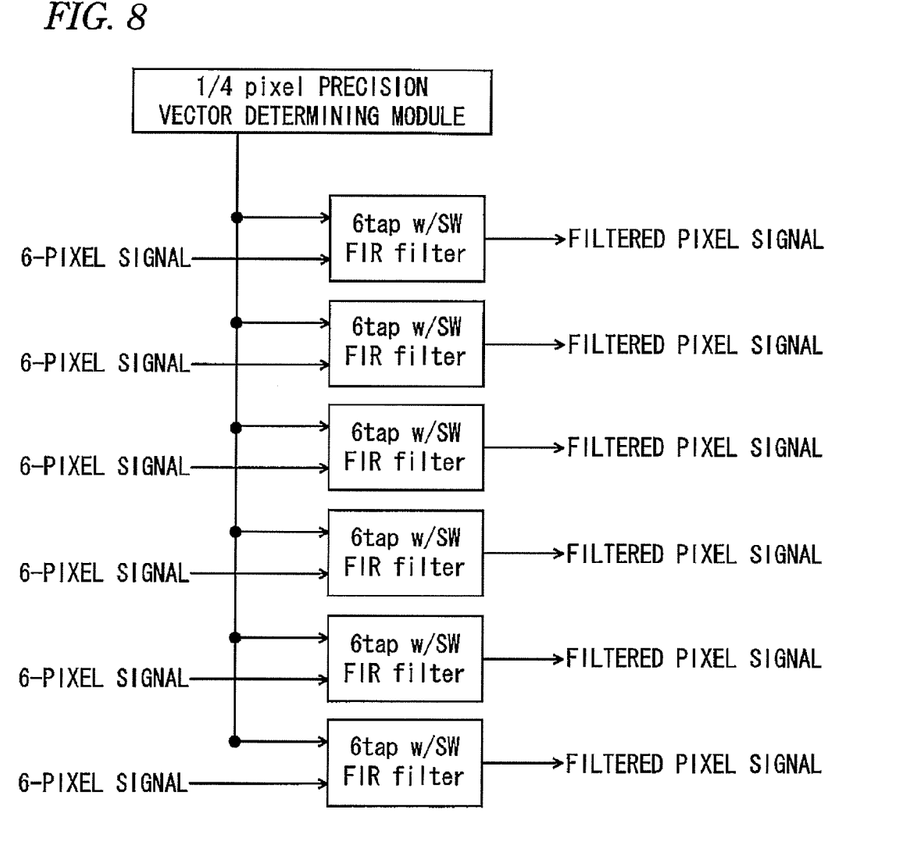
FIG. 8 illustrates a block configuration of each 6-tap w/SW FIR filter×6 circuit used in the embodiment.

FIG. 8 shows details of each 6-tap w/SW FIR filter×6 circuit. Each 6-tap w/SW FIR filter×6 circuit has six 6-tap w/SW FIR filters which are turned on or off simultaneously by a signal supplied from the ¼ pixel precision vector determining module. The 6-tap w/SW FIR filter×6 circuit receives six 6-pixel signals and outputs filtered pixel signals. As shown in FIG. 6, each 6-tap FIR filter generates one pixel from a signal consisting of six pixels that is output from the upstream 6-tap w/SW FIR filter×6 circuit. Like each 6-tap w/SW FIR filter, each 6-tap FIR filter has filter coefficients (1, −5, 20, 20, −5, 1)/32.

Each averaging filter shown in FIG. 6 is a filter which receives two pixel signals and performs linear interpolation. Each averaging filter has filter coefficients (½, ½).

Figure 9:
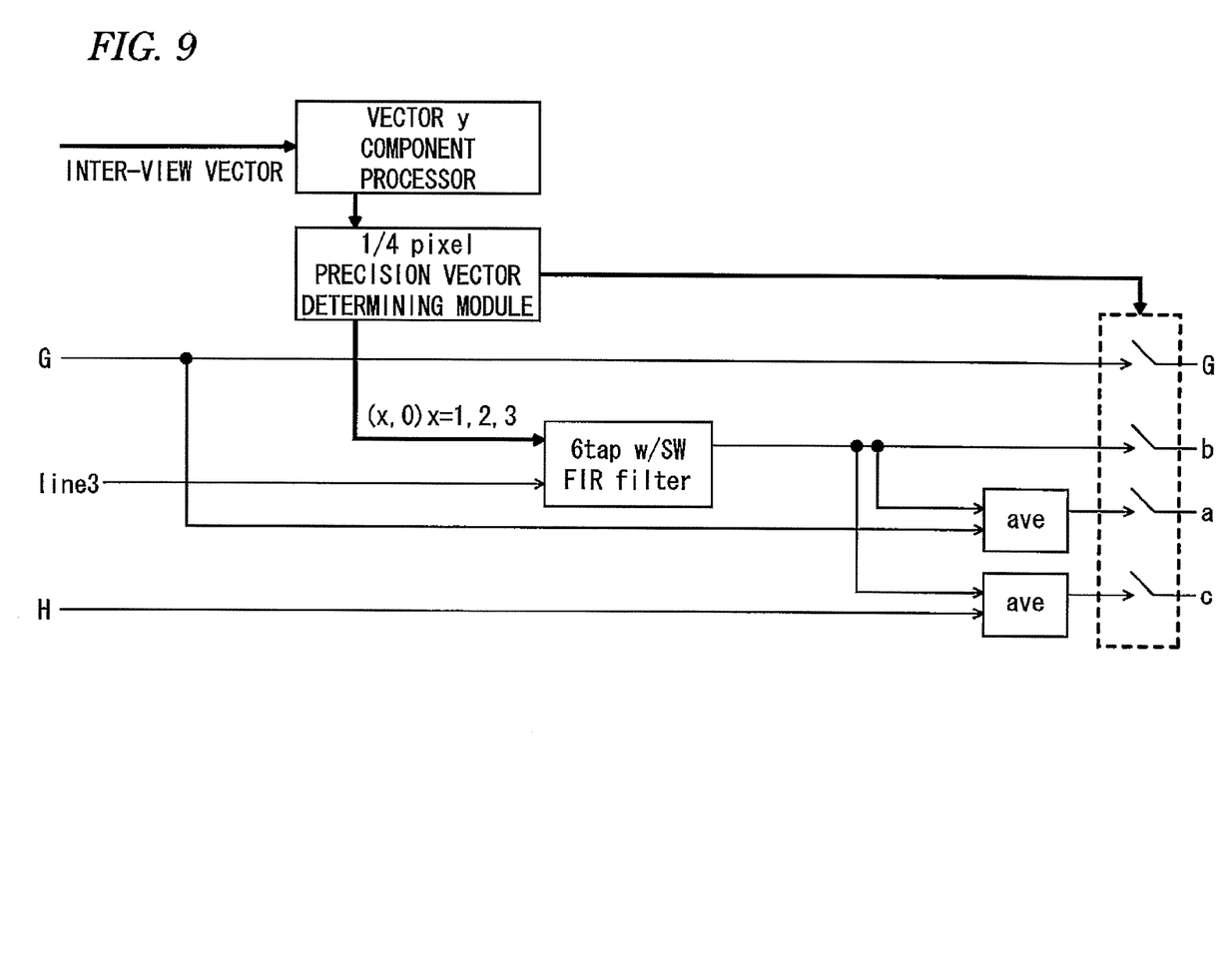
FIG. 9 illustrates a block configuration of a pixel interpolation generator of an inter-view compensated predicting module 309d.

FIG. 9 shows a pixel interpolation generator of the inter-view compensated predicting module 309d. The inter-view compensated predicting module 309d receives a ¼ pixel precision inter-view vector and processes its y component. The method for changing the precision of the y component of an inter-view vector to integer pixel precision may be rounding-off/rounding-up or rounding. Input picture signals G, line3, and H are pixel signals of integer pixel precision pixel positions, and output pixel signals a, b, and c are interpolation-generated signals. A ¼ pixel precision vector determining module, a 6-tap w/SW FIR filter, and an averaging filter are the same as in the pixel interpolation generator of the motion compensated predicting module 309c. In FIG. 6, a region corresponding to the pixel interpolation generator of the inter-view compensated predicting module 309d is enclosed by a chain-line rectangle. It is seen that the circuit scale is much smaller than in a case that inter-view vectors are processed at the same precision as motion vectors.

The circuit of FIG. 6 is constructed in a parallel manner to clearly show that different pieces of processing are performed for respective ¼ pixel precision pixel positions. However, in practice, it is expected that the pixel interpolation generator of the motion compensated predicting module 309c is constructed in a smaller circuit scale than shown in FIG. 6. However, it is apparent that the present application provides the advantage that the circuit scale is reduced very much or the processing speed is increased greatly because the pixel interpolation generator of the inter-view compensated predicting module 309d requires only one 6-tap w/SW FIR filter.

As described above, omitting part of operations to be performed on an inter-view vector in inter-view prediction makes it possible to greatly reduce the amount, per frame, of processing that is necessary for decoding. Therefore, even if the video reproducing apparatus 1 is rendered in a heavy load state because another program is run during decoding processing, such trouble as loss of a frame or extremely slow motion of an object can be prevented. Decoding and reproduction of a moving picture can thus be continued smoothly.

In the above-described embodiment, attention is paid to similarity between pictures that are subjected to inter-view prediction. The processing amount of the decoder is reduced by processing the vertical components of vectors at integer pixel precision in inter-view compensated processing in decoding a picture in inter-view prediction. This processing amount reduction processing is not performed all the time but only when the load is heavy (loads of various kinds of processing performed by the player are detected). Picture quality degradation is thus minimized.

The above-described embodiment provides an advantage that the power consumption can be reduced and real-time decoding of a multiview moving picture which requires an enormous amount of processing can be realized in AV equipment by omitting part of the processing of a video decoder according to the load of a processor or the residual capacity of a battery.

In the device for decoding a moving picture (see FIG. 1), the following pieces of processing are performed to reduce the processing amount of decoding:

(1) The processing load detector detects a total processing load from a processing load of the video decoder and loads of other kinds of processing such as audio processing and rendering processing. The video decoder may perform simplified processing according to resulting load information (see FIG. 2).

(2) If simplified processing is commanded in decoding processing of the video decoder, the vertical components of inter-view vectors of inter-view prediction are processed at integer pixel precision (see FIG. 10).

In summary, in the multiview moving picture decoding device, the processing load detector detects a total processing load from a processing load of the video decoder and loads of other kinds of processing such as audio processing and rendering processing. Simplified processing is performed if the total processing load is heavier than a prescribed load. In this case, the vertical components of inter-view vectors of inter-view prediction are processed at integer pixel precision.

The power consumption can be reduced and real-time decoding of a multiview moving picture which requires an enormous amount of processing can be realized in AV equipment by omitting part of the processing of a video decoder according to the load of a processor or the residual capacity of a battery.

The invention is not limited to the above embodiment, and can be practiced so as to be modified in various manners without departing from the spirit and scope of the invention. In the case of 3D video consisting of left-eye and right-eye pictures, the invention is based on the assumption that the vertical components of inter-view vectors of inter-view prediction have small variations and hence picture quality degradation is low even if they are processed at integer pixel precision. On the other hand, in the case of processing a picture taken by two cameras arranged in the vertical direction, it may be appropriate that the video decoder be configured so as to process the horizontal components of inter-view vectors of interview prediction at integer pixel precision.

Various inventions can be conceived by properly combining plural constituent elements disclosed in the embodiment. For example, several ones of the constituent elements of the embodiment may be omitted.

The invention claimed is:

1. A moving picture decoding apparatus for decoding a compression-coded moving picture stream, comprising:
    an inter-view predicting module configured to perform an inter-view prediction processing on processing subject blocks of each frame to be decoded, the inter-view prediction processing includes a first inter-view prediction processing in which both of a vertical component and a horizontal component of an inter-view vector is processed with a first precision; and a second inter-view prediction processing in which the vertical component of the inter-view vector is processed with a second precision while the horizontal component thereof is processed with the first precision, the first precision being to a higher precision than the second precision;
    a load detector configured to detect an apparatus processing load;
    a judging module configured to judge whether the detected apparatus processing load is smaller than a given value; and
    a controller configured to control the inter-view predicting module to perform the first inter-view prediction processing if the judging module judges that the apparatus processing load is smaller than the given value, and
    to perform the second inter-view prediction processing if the judging module judges that the apparatus processing load is not smaller than the given value.

2. The apparatus of claim 1, wherein the first precision is a one-quarter (¼) pixel precision, and wherein the second precision is an integer pixel precision.

3. The apparatus of claim 1, further comprising:
    a monitor configured to display each decoded frame.

4. A moving picture decoding method for decoding a compression-coded moving picture stream, comprising:
    performing an inter-view prediction processing by a processor on processing subject blocks of each frame to be decoded, the inter-view prediction processing includes a first inter-view prediction processing in which both of a vertical component and a horizontal component of an inter-view vector is processed with a first precision; and a second inter-view prediction processing in which the vertical component of the inter-view vector is processed with a second precision while the horizontal component thereof is processed with the first precision the first precision being to a higher precision than the second precision;

detecting an apparatus processing load;

judging whether the detected apparatus processing load is smaller than a given value;

performing the first inter-view prediction processing if the judging module judges that the apparatus processing load is smaller than the given value, and performing the second inter-view prediction processing if the judging module judges that the apparatus processing load is not smaller than the given value.

5. The apparatus of claim 1, wherein the apparatus processing load includes a processing load for decoding, a processing load for rendering, and a processing load for audio processing.

6. The moving picture decoding method of claim 4, wherein the first precision is a one-quarter (1/4) pixel precision and the second precision is an integer pixel precision.

7. An apparatus for decoding a compression-coded moving picture stream, comprising:

a memory; and a data processor communicatively coupled to the memory, the data processor executing functions stored in memory to (1) perform an inter-view prediction processing on processing subject blocks of each frame to be decoded, (2) detect an apparatus processing load and (3) judge whether the detected apparatus processing load is smaller than a given value, wherein the inter-view prediction processing includes (i) a first inter-view prediction processing in which both of a vertical component and a horizontal component of an inter-view vector is processed with a first precision and (ii) a second inter-view prediction processing in which the vertical component of the inter-view vector is processed with a second precision while the horizontal component thereof is processed with the first precision, the first precision being to a higher precision than the second precision, wherein the first inter-view prediction processing is performed if the apparatus processing load is smaller than the given value and the second inter-view prediction processing if the apparatus processing load is not smaller than the given value.

8. The apparatus of claim 7, wherein the first precision is a one-quarter (¼) pixel precision, and the second precision is an integer pixel precision.

9. The apparatus of claim 7, further comprising:

a monitor configured to display each decoded frame.

\* \* \* \* \*